(12) United States Patent
Weinbrenner (10) Patent No.: US 6,445,353 B1
(45) Date of Patent: Sep. 3, 2002

(54) REMOTE CONTROLLED ACTUATOR AND ANTENNA ADJUSTMENT ACTUATOR AND ELECTRONIC CONTROL AND DIGITAL POWER CONVERTER

(75) Inventor: Richard L. Weinbrenner, Lemont, IL (US)

(73) Assignee: Weinbrenner, Inc., Lemont, IL (US)

( * ) Notice: Subject to any disclaimer, the term of this patent is extended or adjusted under 35 U.S.C. 154(b) by 0 days.

(21) Appl. No.: 09/933,375

(22) Filed: Aug. 20, 2001

Related U.S. Application Data
(60) Provisional application No. 60/269,939, filed on Feb. 20, 2001, and provisional application No. 60/244,192, filed on Oct. 30, 2000.

(51) Int. Cl.$^7$ ................................................. H01Q 3/00
(52) U.S. Cl. ...................................... 343/763; 343/766
(58) Field of Search .............................. 343/763, 758, 343/760, 762, 764, 765, 766, 757; H01Q 3/00

(56) References Cited

U.S. PATENT DOCUMENTS

| | | | | |
|---|---|---|---|---|
| 4,123,757 A | * | 10/1978 | Lapp et al. .................. 343/766 |
| 4,788,550 A | * | 11/1988 | Chadima, Jr. ................ 343/712 |
| 4,907,009 A | * | 3/1990 | Pinson ........................ 343/766 |
| 5,396,815 A | * | 3/1995 | Polites et al. .................. 74/61 |
| 5,469,182 A | * | 11/1995 | Chaffee ....................... 343/882 |
| 6,181,285 B1 | * | 1/2001 | Sullivan et al. .............. 343/703 |
| 6,195,060 B1 | * | 2/2001 | Spano et al. ................. 343/766 |
| 6,218,999 B1 | * | 4/2001 | Bousquet et al. ............ 343/765 |
| 6,239,744 B1 | * | 5/2001 | Singer et al. ................ 342/359 |
| 6,283,859 B1 | * | 9/2001 | Carlson et al. ................ 463/36 |
| 6,313,805 B1 | * | 11/2001 | Nishiyama ................... 343/766 |

* cited by examiner

Primary Examiner—Don Wong
Assistant Examiner—Trinh Vo Dinh
(74) Attorney, Agent, or Firm—Jeffrey P. Calfa

(57) ABSTRACT

A remote controlled actuator system has a motor with a drive or screw shaft. The motor drives a sliding element propelled by the screw shaft. The control circuit may include steering diodes to minimize wires where there is sensing or more than one actuator. A remote controller may direct motor movement of individual actuators without a local controller. The remote actuator may be used to sense remote position through the steering diodes. There is a bipolar and bi-level drive circuit providing the step voltage to achieve high performance motor movement. The guideway may have an internal keyway along with an anti-rotation sliding bearing protected against rotation by the keyway. This anti-rotation sliding bearing restricts the piston to linear travel along the driving motor lead screw thread. The position sensor may include a resistive element sliding contact mounted to the sliding piston. A special coaxial mechanical coupling method simplifies installation.

22 Claims, 7 Drawing Sheets

ANTENNA
ACTUATOR
MOUNT

REMOTE CONTROLLED ACTUATOR AND ANTENNA ADJUSTMENT ACTUATOR AND ELECTRONIC CONTROL AND DIGITAL POWER CONVERTER

This non-provisional patent application claims the priority of Provisional Patent Application Ser. Nos. 60/244,192, filed Oct. 30, 2000, and 60/269,939, filed Feb. 20, 2001.

BACKGROUND

This invention relates to a remote controlled actuator and electronic control. The actuator may be used to adjust the phasing or external receiving or transmitting element of an antenna such as used in cellular and other systems. Additionally, this invention relates to a digital power converter that may be used separately in various applications as well as providing power for driving the motors of controlled actuators. The actuator system will also have a wide variety of other uses where the application demands characteristics, such as: Low EMI (low electromagnetic emissions), stable current and voltage control to the motor coils over long cables, a minimum of conductors in the cable, non-volatile, absolute position feedback and low cost. Additionally it is advantageous to not have fragile electronic components in the remote actuator due to the potential hazards of nearby static electricity and lightning hazards.

PRIOR ART

Remote actuators for antenna systems have been previously suggested. In the system described U.S. Pat. No. 6,239,744; there are remote antenna actuators each having a separate remote micro controller with a main controller at a different location. Each of these remote controllers would be susceptible to the elements including static electricity and lightening. Use of sensors to determine remote actuator position has been known as described in the '744 patent, it however did not do remote actuator position sensing from a resistance change due to motor linear drive shaft movement.

In the prior art there have been dual polarity bipolar power drive circuits. These circuits could only have bi-level voltage supplies by having separate power supplies at the different voltages.

What is needed and does not exist in the prior art are sets of multiple remote controlled actuators that do not need more than one electronic controller and do not need to have an also remotely located electronic controller. Also a remote actuator is needed that has low EMI characteristics, stable current and voltage control to motor coils over long cables, a minimum of conductors in the cable, non-volatile, absolute position feedback. Also needed is a remote actuator sensor that provides accurate actuator position from linear drive shaft movement. Also needed is a dual polarity multi-level power converter that does not require different voltage sources.

SUMMARY

An object of the invention is to provide a remote controlled actuator that does not need more than one electronic controller and does not need to have an also remotely located electronic controller. Also an object of this invention to have a remote actuator that has low EMI characteristics, stable current and voltage control to motor coils over long cables, a minimum of conductors in the cable, and non-volatile, absolute position feedback. An additional object is to provide a remote actuator position indicator that determines position from a motor linear drive shaft. Another object of the invention is to provide a dual polarity multi-level power converter that does not require different voltage sources.

The remote controlled actuator of this invention satisfies all the objects of the invention and others not mentioned. In its broadest embodiment, the actuator system has a motor with a drive or screw shaft. The motor may drive a nut or piston that rides on the screw shaft. The motor may be a two-phase brush-less motor known as a step or stepper motor. The control circuit may include two or more steering diodes to minimize wires for position sensing where there are two or more actuators being driven remotely. A remote controller may direct motor movement of individual actuators without a local to the motor controller. There is a multi-level drive circuit to provide the step voltage to boost current flow and then to reduce the voltage once the motor current reaches the desired level. The control circuit commutates the motor coils by alternating the drive polarity by using pulse width modulation techniques vary the voltage anywhere between the positive and negative voltage rails. In one embodiment the multi-level drive circuit is a dual polarity multi-level power converter that does not require more than one power source. More importantly the multi-level power converter acts to stabilize the voltage of two different power rails while a pulse width modulator is used to vary the duty cycle input signal and hence provide varying levels of power of dual polarity. The multi-level power converter may be used in other applications beyond driving motors no less for driving motors for positioning cellular antennas.

The mechanical actuator may have a barrel or other mechanical guideway that may be made of plastic or metal containing a sliding piston or member which is threaded as a nut that is propelled by a motor lead screw shaft and also accomplishes a linear bearing means. The barrel may have an internal keyway along with an anti-rotation sliding or rotating bearing protected against rotation by the keyway. This anti-rotation sliding bearing restricts the piston to linear travel along the driving motor lead screw thread. These features form a linear actuator when used with a motor such as a step motor.

The position sensor may include a resistive element sliding contact mounted to the sliding piston. The sliding contact bridges between two tracks on the resistive element to create an electrical potentiometer whose resistance will be a function of the position of the piston. Where used, the electrical contacts are connected to a circuit, which can read or relay this position information using electrical current or voltage to the main controller.

The piston may be mechanically engaged to drive an object, for example a phasing element of an antenna or for changing down angle of a cellular antenna on a cellular tower. The motor may be used to position the piston that in turn positions the phasing or receiving element of the antenna. Such repositioning of the phasing or receiving element of the antenna may change the response or performance of the system, cellular or otherwise, which is in electrical connection with the phasing or receiving element. There is an additional advantage relating to installation and service due to the coaxial like mechanical connector with two sets of threads between the actuator barrel and the outer body or bushing of the object to be actuated and the internal threading between the piston and the control rod of the object to actuated. When the object to be actuated is a cellular antenna and the actuator is changing down angle of the antenna, servicing personnel are required to access these antennas high up on towers. The coaxial like engagement allows for proper installation with less effort. Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

The attached FIGS. 1 to 10 show a remote controlled actuator 101 made in accordance with this invention. In its broadest embodiment, the actuator system has a motor 102 with a drive or screw shaft 103. The motor 102 may drive a sliding element or piston bearing 104 that rides on the screw shaft 103. There may be a multi-level drive circuit 131 to provide the step voltage to initiate motor movement and then to back off the voltage once the motor 102 is moving the piston 104. The control circuit 131 may include a pulse width modulator 141 that regulates the power to the motor coils and a DSP or a microprocessor to commutate the motor coils. The actuator 101 may have a body or barrel or other guideway 105 which may be made of plastic or metal containing the sliding element or piston 104. The sliding piston may be threaded as a nut that is propelled by a motor lead screw shaft 103 and also accomplishes a linear bearing means. The barrel 105 may have an internal keyway 106 along with an anti-rotation sliding or rotating bearing 107 protected against rotation by the keyway 106. This anti-rotation sliding bearing 107 may restrict the piston 104 to linear travel along the driving motor lead screw thread.

A position sensor 119 may include a resistive element sliding contact 109 mounted to the sliding piston 104. The sliding contact 109 may bridge between two tracks on a linear resistive element 108 to create an electrical potentiometer whose resistance will be a function of the position of the piston 104. Where used, the electrical contacts are connected to position circuit 151, which can read or relay this position information using electrical current or voltage to a main controller 137.

Also it is an important property that the actuator 101 may be powered off and due to the low pitch of the lead screw the device will not back drive, but rather it will stay locked in place.

Figure 1:
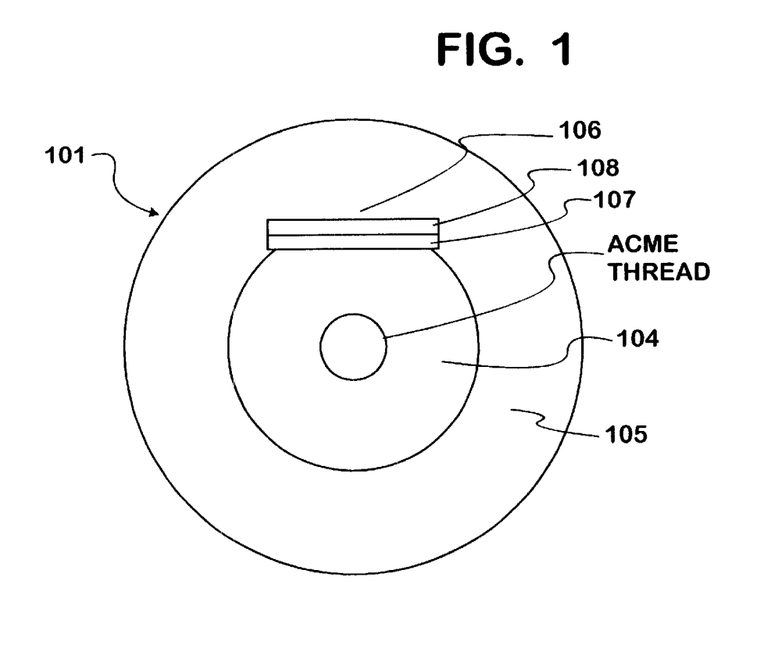
FIG. 1 is an end view of a cylinder and piston of a remotely controlled actuator made in accordance with this invention.
Figure 2:
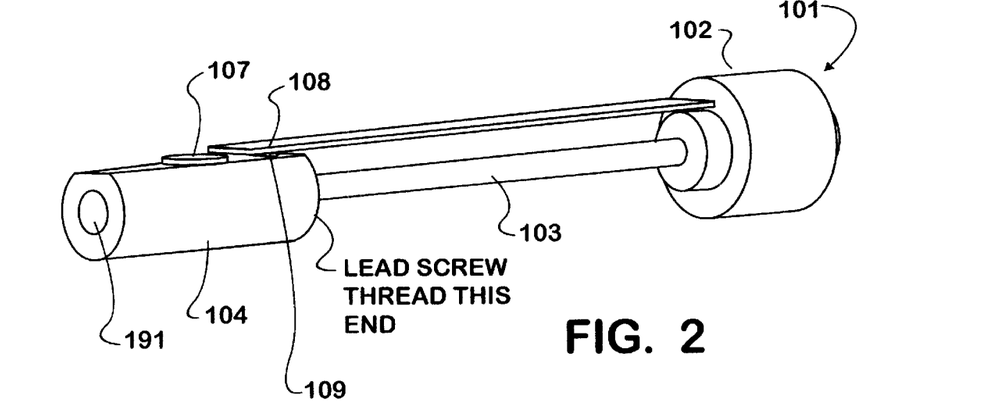
FIG. 2 is a perspective view the internal mechanical components of the actuator of FIG. 1.
Figure 3:
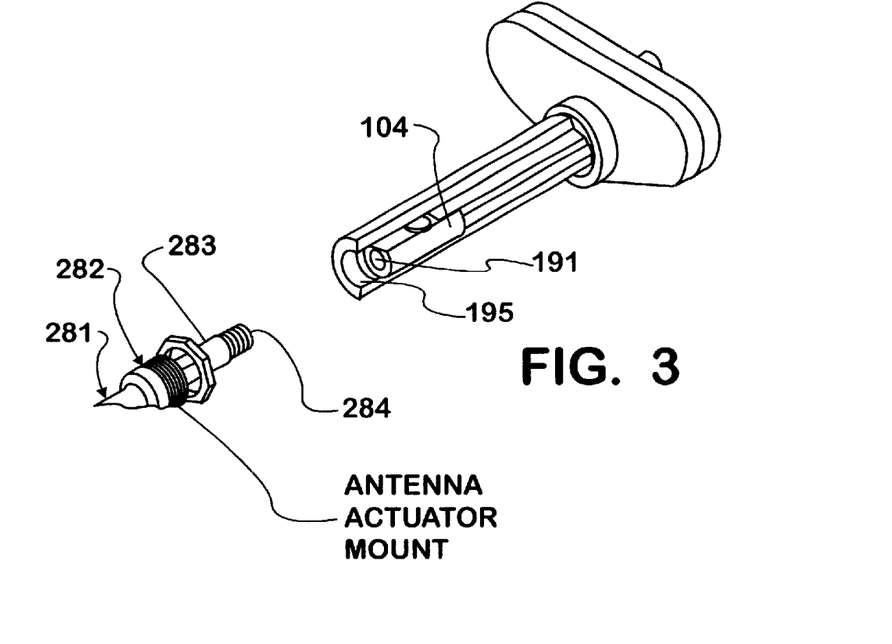
FIG. 3 is a cutaway perspective view of the actuator of FIGS. 1 and 2.
Figure 4:
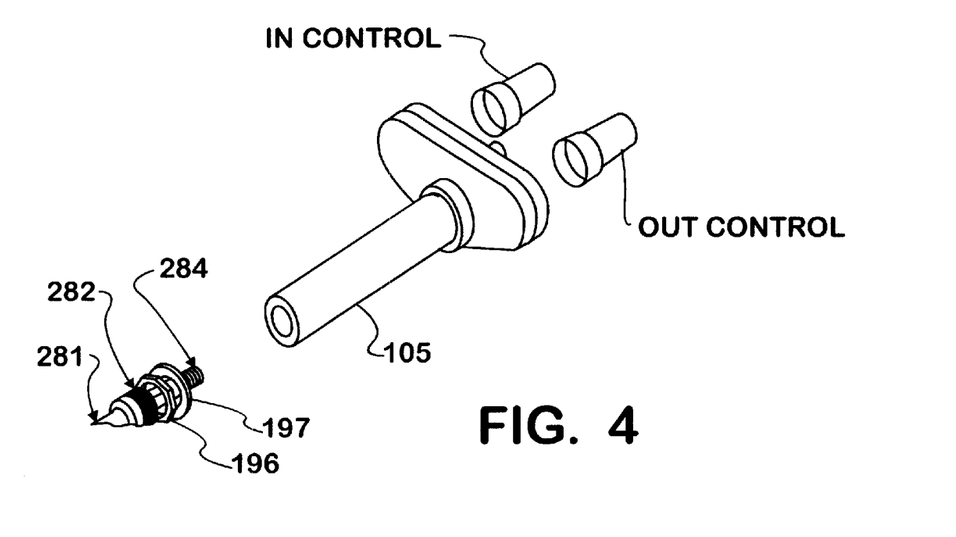
FIG. 4 is a perspective view of the actuator of FIGS. 1 and 2.

The actuator 101 may be coupled to an external device in a number of ways. The actuator 101 fixed body or barrel 105 must be coupled to a fixed body 282 of the device being actuated 281, and sliding element or piston 104 must be coupled to a moving part of the device to be actuated 281. Refer to FIG. 3: One compact method of coupling uses an internal thread 191 in the piston 141 (in addition to the Lead screw 103 thread in the opposite end of the piston 104) and an internal actuator mounting thread 195 in the barrel (body) 105 of the actuator 101. Both threads 191 and 195 must be of the same pitch to support this mounting and coupling scheme. The actuated rod 283 on the actuated device 281 must be extendible into the barrel 105 of the actuator 101 where it can thread into the piston 104 several turns using the actuated rod threaded end 284. Then the barrel 105 may be threaded onto the actuated device's 281 mounting threads 195, and several more turns of the actuator 101 are accomplished, which is simultaneously threading both the piston 104 and the actuator barrel body 105 at the same pitch.

A locknut 196 and gasket 197 fix the mounting orientation and also seal the junction between the actuator barrel 105 and the actuator-bushing mount once it is threaded on. See FIG. 4. Note the device to be actuated 281 may be an antenna 181. One specific antenna embodiment would have the actuator positioning the down angle of a cellular antenna on a cellular tower.

The controller 137 optionally may contain a programmable clock driven system which can move the actuator 101 to particular positions at particular times of the day, extending to take into consideration weekends and holidays for a weekly, seasonal or yearly calendar. Also, preprogrammed events can be programmed as exceptions to the regular control clock calendar driven sequence. Additionally, the controller 137 or actuator 101 can be used to physically reposition a component of an antenna 181 in concert or combination with a system that senses the need for adjustment of an antenna 181 and automatically provides repositioning signals to the controller or actuator 181 of this invention.

Any motor 102 with a lead screw 103 coupled to a similarly threaded piston 104 can be used. Also a linear actuator type motor 102 where the screw 103 is fixed and the body of the motor 102 moves can be used, however in this case a metal enclosure is required so no change in RF signature is detectable due to the moving internal metal parts for applications where that is a requirement. The linear motion is communicated external to the body of the device using non-metallic actuator rods for applications where that is a requirement.

A two-phase stepper motor 102 may provide the ability to reduce the number of wires in the control cable for a multiple motor system.

The daisy chain method of connecting actuator motors, sensor and calibration for sensor makes it intuitive to hook up the multi-actuator system and does not require any accessories. This is mechanically shown in FIGS. 7 and 8 and electrically in FIGS. 5 and 6. This technique is expandable to four actuators using just 10 wires; more actuators can be included at a wire count increment of just 2 wires per additional actuator. This wire reduction is accomplished by having two steering diodes for sensing position for each motor and by having a dual polarity bipolar drives method in conjunction with a motor common return.

The normal connection of a step motor would require a lead from each end of the 2 coils in a two-phase step motor, which would require 4 wires. The control circuit 131 of this invention may be made with reduced cabling costs by reducing the number of wires and that is possible when there is 1 actuator and more-so when there are at least 2 actuators. This is shown in the embodiment shown in FIGS. 5 and 6. It is advantageous to return one end of both coils found in a 2 phase step motor 102 to a common return as shown as 'Motor Return Common', which is connected at Pin 7 of the IN connector. Then the controller can alternatively drive the other end of the coil with a positive or negative voltage or current as is shown connected to the IN connector pins 5 and 6. Note also from FIG. 5 that the signals from the IN connector pass to the out connector such that the IN connector pins 3 and 4 are routed to pins 5 and 6 of the output connector. Similarly pins 1 and 2 of the IN connector are routed to pins 3 and 4 of the out connector. In this manner several actuators can be daisy chained. This scheme is expandable to a larger number of motors 102.

Figure 5:
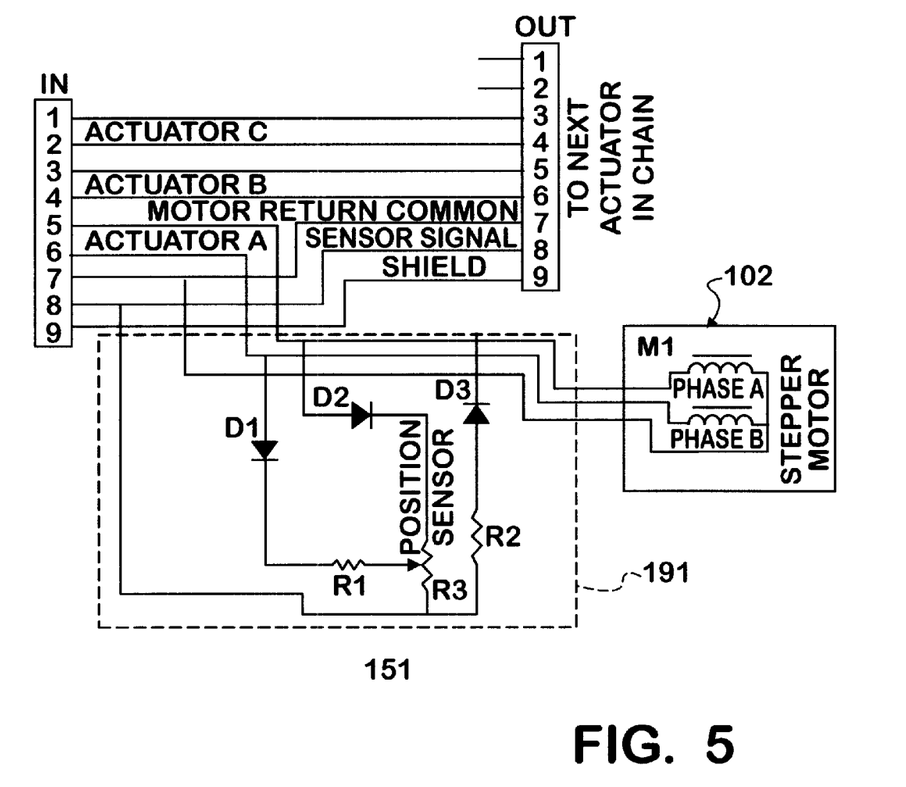
FIG. 5 is electrical schematic diagram of the minimal circuitry required for the actuator with position sensor of FIGS. 1 and 2.

To provide for feedback such that the system can verify that the motor 102 did reposition the piston and anything connected to the piston properly, the resistive element R3 (108) is mechanically coupled to the lead screw of the actuator stepper motor M1 (102). The controller 137 energizes Phase A of the stepper motor 102 with a very low positive voltage which causes current to flow through D2, and through the element of R3 and back to the controller on pin 8. Then the controller energizes Phase B of the controller at a low positive voltage that causes current to flow through D1, R1 and the wiper of R3. Using these two currents we can calculate the resistance ratio which will relate to the position. Energizing one coil or the other of the step motor 102 at a very low voltage relative to normal driving voltage will not cause it to run, however it may change the motor's rotor position by very little and in typical applications that is of no consequence. Furthermore by taking the measurement quickly the motor 102 will not perceptibly move at all due to the slow rise of current in the motor inductance.

Figure 6:
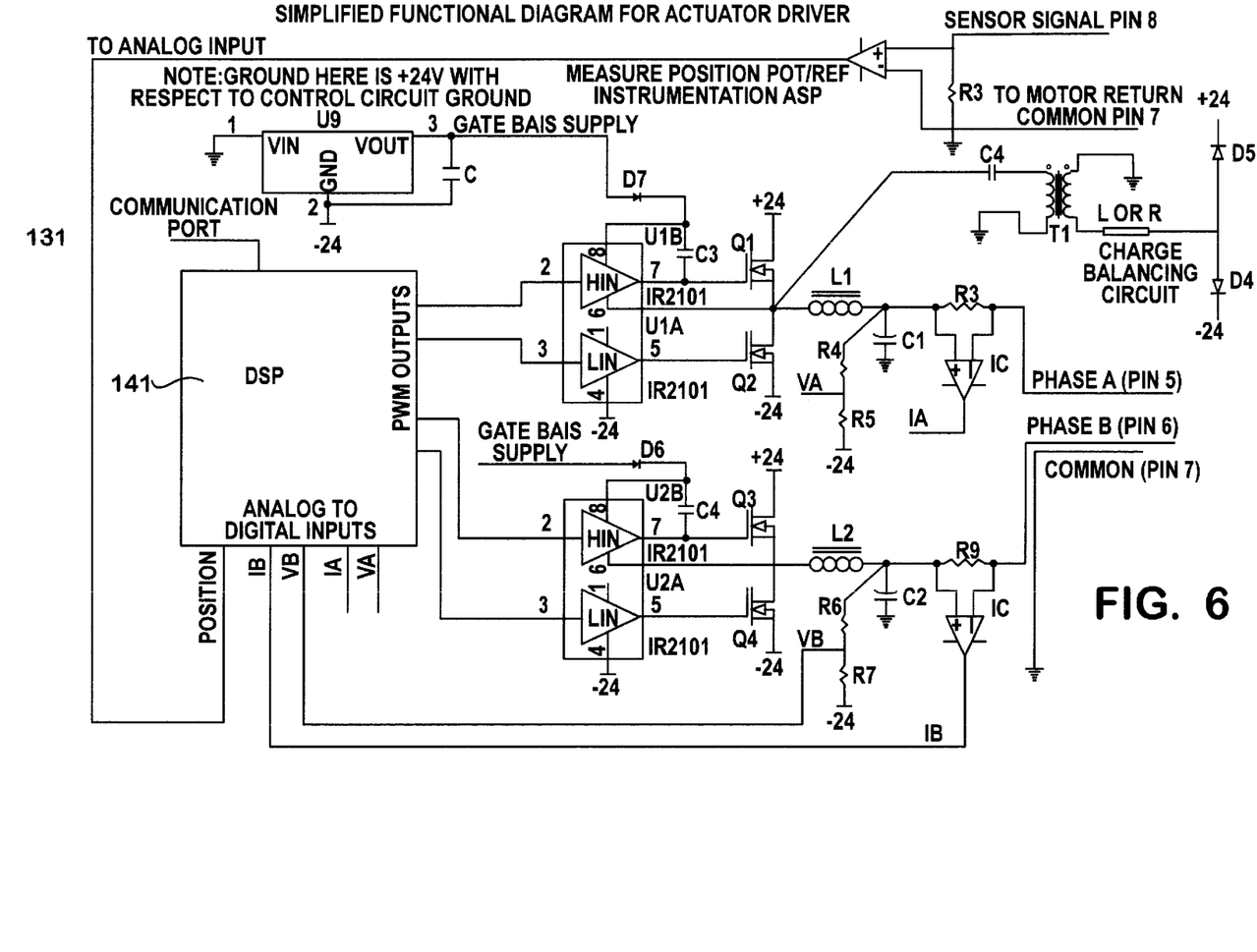
FIG. 6 is a functional diagram of the circuit for controlling an actuator made in accordance with this invention.
Figure 7:
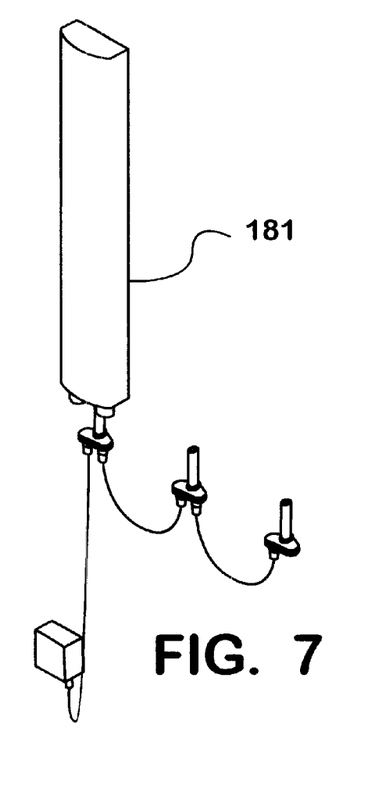
FIG. 7 is a perspective view of a three actuator embodiment of this invention.
Figure 8:
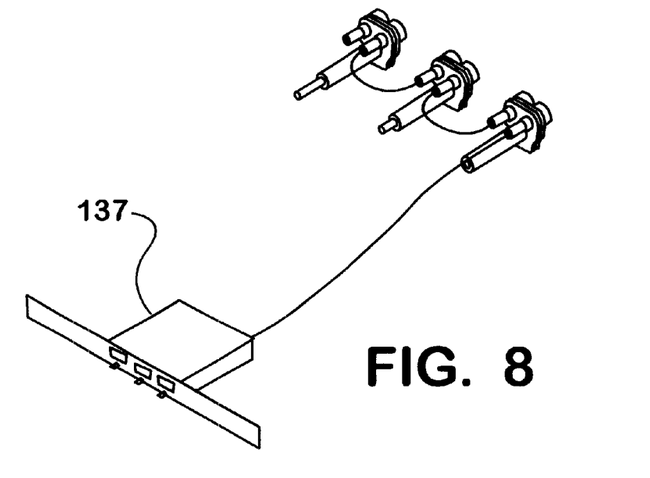
FIG. 8 is a perspective view of another embodiment of a multi-actuator version of this invention.
Figure 9:
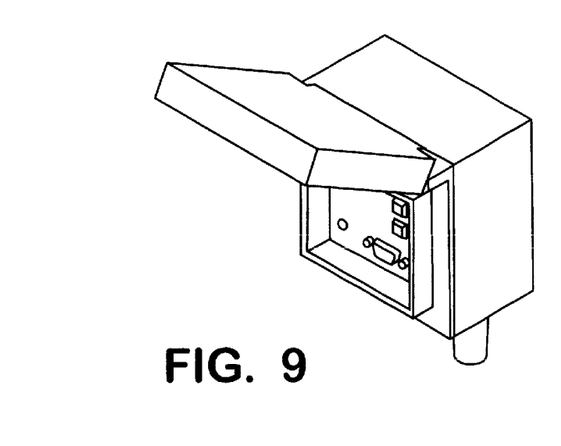
FIG. 9 is perspective view of a controller box for an embodiment of this invention.
Figure 10:
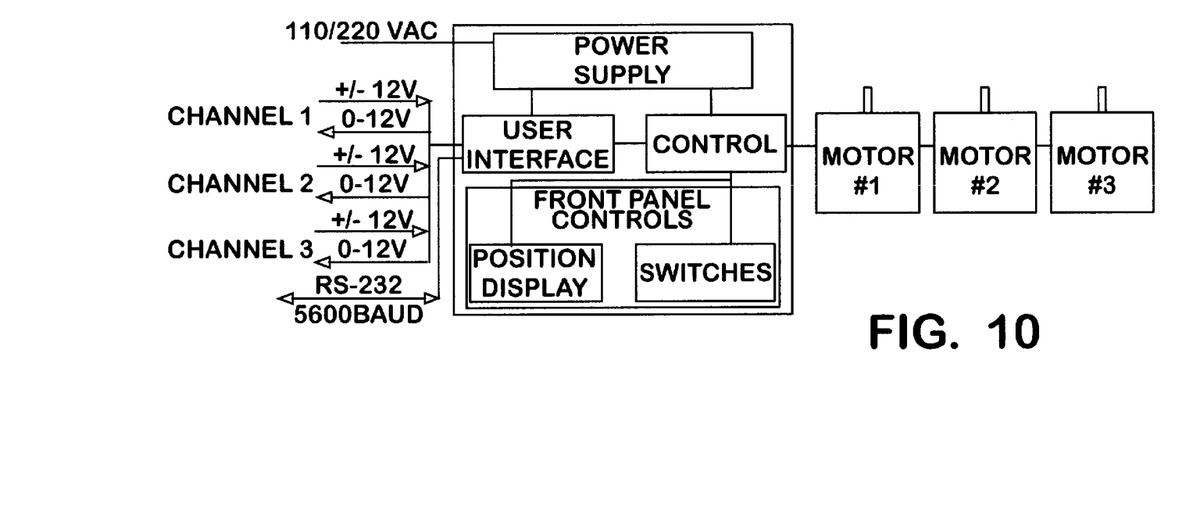
FIG. 10 is a simplified block diagram overview of a control system for a multi-actuator embodiment of this invention.

The logic of FIG. 6 is shown with its ground reference tied to the −24 volt power rail. With respect to this electrical potential the motor return ground is at a +24 volt level, and the +24 volt rail is at +48 volts with respect to the logic ground as used in this implementation. This is not necessary, the circuit can operate off the power ground reference or any other supply so long as the Q1/Q2 and Q3/Q4 switches can be driven with a proper isolated drive technique, and the analog bipolar signal transformations or accommodations are met. Note that the Q3/Q4 is necessary where there is a two-phase motor as in the embodiment shown although other configurations may be applicable depending on the choice of motor. Note also that the absolute value of 24 volts is not a requirement and that any absolute voltage value may work depending on application.

The Digital Signal Processing (DSP) functional block shown in FIG. 6 contains a programmable electronic device capable of implementing certain sequenced signals to the transistor switches Q1, Q2, Q3 and Q4. U1 and U2 depict a suitable driving device to translate the signals from the sequence logic or processor depicted in the DSP block. Q1 and Q2 drive one coil of the step motor 102, and can provide either a positive drive voltage or a negative drive voltage. This voltage can be pulse width modulated to provide an average voltage at the output of the L1/C1 low pass filter. The filter has a sufficiently low pass frequency with respect to the switching frequency of the Pulse Width Modulation (PWM) output such that only a small ripple is present at L1/C1. This characteristic reduces the potential for EMI. R4/R5 and R8 and its amplifier when used may establish a voltage and current monitoring point respectively that the DSP block optionally monitors to accomplish certain control strategies. A PWM or some other circuit for varying the duty cycle of the inputs to the Q1/Q2 or the Q3/Q4 bridges may vary the levels to allow a larger voltage output initially, say to coerce current in the motor coils to rise quickly for high performance in the motor 102. Then the duty cycle varying circuits varies the levels so that a lower sustaining voltage is used once the current reaches the desired rating of the motor. This varying of duty cycle will obtain quicker response without exceeding the ratings of motor 102 coils.

However this PWM process also transfers charge from one power supply rail to the other, minus to plus or plus to minus depending on the output voltage polarity. In one embodiment, the charge balance circuit consisting of C4, T1, L or R, D5 and D4 accomplish this task on a cycle-by-cycle basis for the entire circuit, and it can be driven at C4 by either phase or an independent dual polarity switch or auxiliary function of a power supply. In another embodiment, the C4 is not necessary to accomplish the charge balancing function, such as when the sub-circuit comprised of T1, D4, D5 are driven from an independent 50% duty cycle circuit. The L or R may be either an inductor or a resistor, and has the purpose of preventing current spikes since the output is driving a capacitive load and also providing a low pass filtering function. Note that the T1 transformer is engaged so as to cause an inversion or reversal of the voltage polarity. This acts to stabilize the rail voltages by reversing the charge transfer. In the depicted example this charge balance circuit will optionally charge the +24 volt rail if only a −24 volt power supply is used. In this way, an opposite polarity voltage rail is created without the expense of providing a dual polarity power supply.

Although a current feedback signal is shown, in certain customized systems it may be not necessary to use the current feedback, and the function it might other wise serve can be replaced using an open loop timing method in the DSP based on knowable characteristics of the motor.

A voltage feedback signal is shown, but in certain customized systems where a known voltage motor coil is used it may not be necessary to implement this feature. If the power supply positive and negative rails are well regulated, the PWM duty cycle will correspond to the output voltage of this circuit, thereby making it feasible to operate without voltage feedback. A similar circuit consisting of Q3/Q4 and L2/C2 drives the other phase of the motor 102.

Step motors resist a change in current due to the inductance of the motor coil. In order to get high-speed performance from this type motor it is necessary to present a relatively high voltage initially to the motor coil, but then to reduce the voltage once the current reaches the motor coil rating. This Bi-Level drive technique is implemented in this circuit by first modulating the PWM to produce the full positive or full negative rail voltage to the motor coil, until the defined current threshold is reached. Then the PWM is modulated to a duty cycle to produce the proper coil voltage so that the motor is not overheated. This threshold may be detected by programming the DSP to monitor Ia or Ib current monitoring signals, or it can in some well-defined applications be done by a timed period of initial high voltage.

In the preferred embodiment the actuator 101 consists of a step motor 102 (sometimes called a stepper motor), an absolute and non-volatile position sensor 119 using a linear resistive element 108 and an electrical wiper element 109 to mechanically pick off the resistance at the mechanical position of the piston 104 along the resistive element 108.

The position sensor 119 can be seen in FIG. 5 and the resistance between the moving contact and the resistive element changes the resistance of a current path that is established. The resistance is ratio-metric, which is to say that if the wiper is ½ the distance between either ends of the R3 position sensor element, the resistance between the wiper and the sensor Signal pin is ½ the total resistance of R3. However to enable the use of a low cost model of this resistive element 108 is a low tolerance device on the order of +/−20% tolerance. Also the actuator 101 may be at the end of a cable of unknown length and of a wire of unknown gauge. As such calibration is necessary to achieve the best performance.

Using the motor coil voltage on either the A or the B phase of the motor, and presenting a known positive or negative voltage on the chosen phase provides for the calibration means. This along with some steering-diodes (D1, D2 and D3) in the actuator 104 permit measuring up to 4 elements, however only three are used here. The current which flows on the Sensor Signal wire is measured across R8 in the control circuit, amplified with any common mode signals removed and presented to the analog to digital converter in the DSP block to be read into a software program for use in the calibration algorithm.

The steering diodes energize the various current paths as follows:

| Select | Phase | Polarity | Current Path | Note: Read implies measuring resistance |
|---|---|---|---|---|
| 1 | A | Neg | Cable + R2 + D3 | Reads known Calibration Resistor R2 + cable |
| 2 | A | Pos | Cable + R3 + D2 | Reads +/− 20% Position Pot R3 |
| 3 | B | Pos | Cable + R + WiperR3 + D1 | Reads R3 Position Wiper to end of R3 |
| 4 | B | Neg | Not Used | |

The current measured in R8 (FIG. 6) can be used to compute the targeted resistance by using the proper formula.

$V_A$=Voltage_On_Phase_A $V_B$=Voltage_On_Phase_B $V_F$=Diode_Forward_Drop $R_1$=Is_Known $R_2$=Is_Known Select = 1
$$R_{CABLE} = \frac{-V_A - V_F}{i_{R8}} - R_2$$

Select = 2
$$R_{POT\_R3} = \frac{V_A - V_F}{i_{R8}} - R_{CABLE}$$

Select = 3
$$R_{POSITION} = \frac{V_B - V_F}{i_{R8}} - R_1 - R_{CABLE}$$

Computed_By_Use_Of_Data_Read
$$Position = \frac{R_{POSITION}}{R_{POT\_R3}} \cdot Total\_Range$$

It is possible in some applications that the step "Select 1" is not necessary and the $R_{CABLE}$ can be assigned to be a small constant. This will be the case if the range from minimum to maximum cable length and wire gauge results in an error within acceptable tolerance.

Furthermore, the system can build a table in a calibration pass, whereby the step motor first retracts the piston until it is assured it engages the mechanical stop, after which it is run to several calibration points visited by the open loop positioning of the step motor and the potentiometric ratio from the sensor is read at each of these points and stored in a table. Thereafter this table can be examined along with interpolation to solve for the actuator position.

The piston 104 serves as a coupling mechanism for the device-to-be-actuated 281 and also as a nut for the motor lead screw 103 and as a linear bearing an potentiometer wiper electrical contact support. It consists of a lead screw, which can be metal even in a sensitive RF environment, due to the fact that it rotates about its own axis. The resultant system thereby has no metal parts that move in such a way as to produce an altered radio frequency signature. i.e. the system signature moves in such a way as to not alter its RF silhouette which ensures there will be no de-tuning effect on nearby RF equipment.

The circuit for the driving multiple actuators shown in FIGS. 5 and 6 are designed to reduce the total number of wires to the remote actuators 101 from the electronic controller circuit 137. This is most desirable in the control of remote actuators such as antennas on remote towers. The combination of the use of the common motor return and the use of the motor coil driving wires with the steering diodes for actuator position sensing are the objects of the methodology of wire reduction. The common motor return for a set of motor actuators reduces the number of wires for every multiple actuator system configuration greater than one, and by 1 wire even on a single actuator system. The method of remotely sensing actuator position through use of a low voltage application of a non-disturbing current to an individual motor coil so that we can energize the position sensing elements results in a wire reduction of two wires per actuator. The steering diodes maintain a voltage barrier between actuator circuits and hence remove interference in position measurement sensing due to undesired current paths between the multiple actuators. Only one extra wire over that needed for a system without position sensing is needed to sense position regardless the number of actuators.

Figure 11:
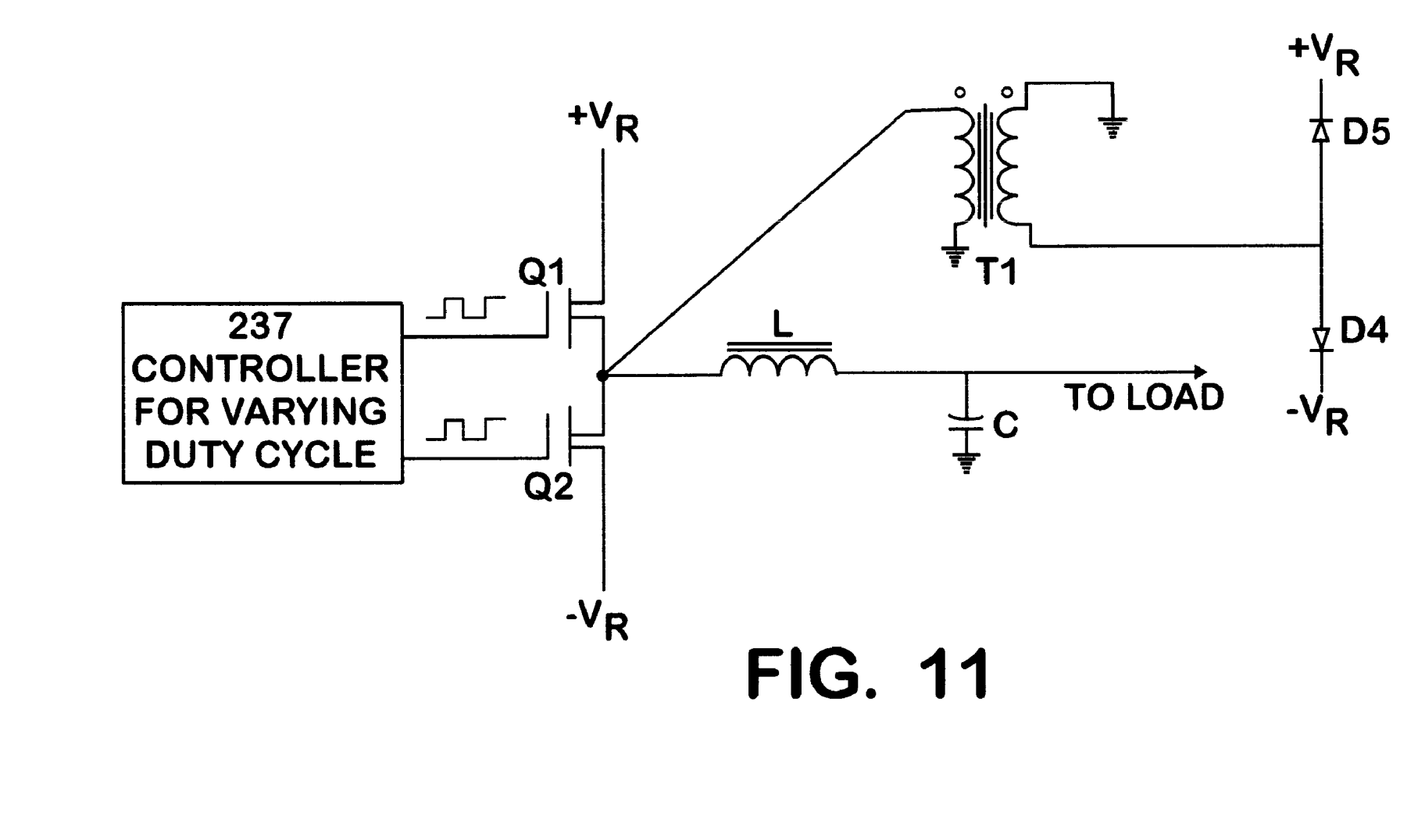
FIG. 11 is a digital power converter and a charge rebalancing circuit made in accordance with this invention.

FIG. 11 shows a multi-level power converter circuit made in accordance with this invention. The power to the load that may be a motor but can be various other type loads comes from the Q1/Q2 transistor bridge. The controller 237 for varying the duty cycle of the power through the Q1 and Q2 transistors may be similar to the DSP applying pulse width modulation as shown in FIG. 6 but may be any circuit that varies the duty cycle of the passage of current from the $+V_R$ voltage rail through Q1 and the passage of $-V_R$ voltage rail through Q2. The signal to the load from the Q1/Q2 Bridge passes through the LC filter. This arrangement with the Q1/Q2 bridge with the LC filter will result in charge transfer which depending on the application of the respective rails changes the absolute value of voltage on one or both of the respective $-V_R$ and $+V_R$ power rails. As a result, the multi-level drive circuit has a charge rebalance sub-circuit comprised of the T1 transformer aligned to invert the Q1/Q2 bridge output (as well as the LC filter input) through D4 and D5. This power inverter acts to stabilize charge from the opposite power rail. An auxiliary gain from this sub-circuit is that the charge rebalance circuit also acts to power the opposite power rail when only one rail is initially powered. This is a distinct advantage over the prior art bi-level circuits where there needed to be a power source for each level power rail. Additionally the dual polarity bipolar bi-level drive circuit achieved here would have required an additional polarity power supply of each level. This cost factor would prevent building such a function in a competitive market.

As described above, the remotely controlled actuator and control system and the remotely controlled actuator and control system for repositioning remote antennas provide a number of advantages, some of which have been described above and others of which are inherent in the invention. Also modifications may be proposed to the remotely controlled actuator and control system and the remotely controlled actuator and control system for repositioning remote antennas without departing from the teachings herein.

I claim:

1. An actuator for repositioning a device to be actuated linearly, comprising:

a motor with a drive shaft;

an electrical controller circuit for controlling said motor;

a sliding element engaged to said drive shaft, said sliding element moving in a linear pattern upon said motor energizing and driving said drive shaft;

a linear resistive element electrically engaged to said electrically controller circuit; and a sliding contact on said sliding element for varying electrical resistance of said resistive element as sensed in said electrical controller circuit as a function of said sliding element position.

2. The actuator of claim 1, comprising:

an anti-rotation bearing on said sliding element in contact with said linear resistive element;

a guideway containing said sliding element, said anti-rotation bearing, and said drive shaft; and said guideway having a keyway along which said anti-rotation bearing rides.

3. The actuator of claim 2, comprising:

said keyway being internal to said guideway.

4. The actuator of claim 1, wherein:

said sliding contact bridges between two tracks on said linear resistive element.

5. The actuator of claim 2, wherein:

said sliding element has an internal thread on an end opposite said end engaged to said drive shaft;

said internal thread on said sliding element for engagement to a thread on a control rod of the device to be actuated;

said guideway having a thread for engagement to a fixed body of the device to be actuated; and said internal thread of said sliding element and said thread of said guideway having identical threading per unit distance.

6. An actuator in combination with a device to be actuated in a linear path, comprising:

a motor with a drive shaft;

an electrical controller circuit for controlling said motor;

a sliding element engaged to said drive shaft, said sliding element moving in a linear pattern upon said motor energizing and driving said drive shaft;

a linear resistive element electrically engaged to said electrically controller circuit;

a sliding contact on said sliding element for varying electrical resistance of said resistive element as sensed in said electrical controller circuit as a function of said sliding element position;

an anti-rotation bearing on said sliding element in contact with said linear resistive element;

a guideway containing said sliding element, said anti-rotation bearing, and said drive shaft;

said guideway having a keyway along which said anti-rotation bearing rides;

said sliding element has an internal thread on an end opposite said end engaged to said drive shaft;

said internal thread on said sliding element engages to a thread on a control rod of said device to be actuated;

said guideway having a thread engaged to a fixed body of said device to be actuated; and said internal thread of said sliding element and said thread of said guideway having identical threading per unit distance.

7. The actuator and device to be actuated combination of claim 6, wherein:

said sliding element of said actuator is made of non-metallic material.

8. A system of actuators for repositioning individual devices, comprising:

a single electrical controller circuit;

at least two actuators, each engaged to individual devices to be actuated, and each actuator comprised of:

a motor with a drive shaft;

a coil driving wire from said electrical controller circuit electrically engaged to each motor coil of said motor;

a sliding element engaged to said drive shaft, said sliding element moving in a linear pattern upon said motor energizing and driving said drive shaft;

a linear resistive element electrically engaged to said electrically controller circuit; and a sliding contact on said sliding element for varying electrical resistance of said resistive element as sensed in said electrical controller circuit as a function of said sliding element position;

said electrical controller having a common motor return wire engaged electrically to each of said actuators;

said electrical controller having a sensing wire engaged electrically to each of said actuators; and said resistive elements of each actuator electrically engaged along with steering diodes to said coil driving wires of each said motor and said sensing wires of each actuator.

9. The system of actuators of claim 8, wherein:

wherein said electrical controller circuit contains a bi-polar, multi-level power converter sub-circuit;

said bi-polar multi-level power converter sub-circuit varies voltage levels to said motor coils passing a higher initial voltage and reducing said voltage following initial voltage application; and wherein said bi-polar multi-level power converter sub-circuit has a single voltage power supply.

10. The actuator system of claim 8, wherein:

said electrically controller circuit measures individual actuator position remotely from said actuators by applying a low voltage signal through a coil driving wire an actuator to be measured, sensing resistance of said linear resistivity element level as a result of relative position of sliding contact position through said sensing wire for said actuator to be measured, and comparing sensed resistance with predetermined values to determine actuator and device to be actuated position.

11. The actuator system of claim 9, wherein:

said electrically controller circuit measures individual actuator position remotely from said actuators by applying a low voltage signal through a coil driving wire an actuator to be measured, sensing resistance of said linear resistivity element level as a result of relative position of sliding contact position through said sensing wire for said actuator to be measured, and comparing sensed resistance with predetermined values to determine actuator and device to be actuated position.

12. An actuator for linearly repositioning an antenna in combination with an antenna, comprising:

a motor with a drive shaft;

an electrical controller circuit for controlling said motor;

a sliding element engaged to said drive shaft, said sliding element moving in a linear path upon said motor energizing and driving said drive shaft;

said sliding element engaged to an antenna for repositioning said antenna;

a linear resistive element electrically engaged to said electrically controller circuit; and a sliding contact on said sliding element for varying electrical resistance of said resistive element as sensed in said remote electrical controller circuit as a function of position of said sliding element.

13. The actuator antenna combination of claim 12, comprising:

an anti-rotation bearing on said sliding element in contact with said linear resistive element;

a body containing said sliding element, said anti-rotation bearing, and said drive shaft; and said body having a keyway along which said anti-rotation bearing rides.

14. The actuator antenna combination of claim 13, comprising:

said keyway being internal to said body.

15. The actuator antenna combination of claim 12, wherein:

said sliding contact bridges between two tracks on said linear resistive element to create an electrical potentiometer whose resistance is a function of position of said sliding element and said antenna.

16. The actuator antenna combination of claim 12, wherein:

said sliding element has an internal thread on an end opposite said end engaged to said drive shaft;

said internal thread on said sliding element engaged to a thread on a control rod of said antenna;

said body having a thread for engagement to a fixed body of said antenna; and said internal thread of said sliding element and said thread of said body having identical threading per unit distance.

17. An actuator in combination with an antenna, comprising:

a motor with a drive shaft;

an electrical controller circuit for controlling said motor;

a sliding element engaged to said drive shaft, said sliding element moving in a linear pattern upon said motor energizing and driving said drive shaft;

a linear resistive element electrically engaged to said electrically controller circuit;

a sliding contact on said sliding element for varying electrical resistance of said resistive element as sensed in said electrical controller circuit as a function of said sliding element position;

an anti-rotation bearing on said sliding element in contact with said linear resistive element;

a guideway containing said sliding element, said anti-rotation bearing, and said drive shaft;

said guideway having a keyway along which said anti-rotation bearing rides;

said sliding element has an internal thread on an end opposite said end engaged to said drive shaft;

said internal thread on said sliding element engages to a thread on a control rod of an antenna;

said guideway having a thread engaged to a fixed body of said antenna; and said internal thread of said sliding element and said thread of said guideway having identical threading per unit distance.

18. A system of actuators for repositioning down tilt angles of cellular antennas in combination with antennas, comprising:

a single electrical controller circuit;

at least two actuators, each engaged to individual antennas to have down angle changed, and each actuator comprised of:

a motor with a drive shaft;

a coil driving wire from said electrical controller circuit electrically engaged to each motor coil of said motor;

a sliding element engaged to said drive shaft, said sliding element moving in a linear path upon said motor energizing and driving said drive shaft;

said sliding element engaged to an individual antenna a linear resistive element electrically engaged to said electrically controller circuit; and a sliding contact on said sliding element for varying electrical resistance of said resistive element as sensed in said electrical controller circuit as a function of said sliding element position;

said electrical controller having a common motor return wire engaged electrically to each of said actuators;

said electrical controller having a sensing wire engaged electrically to each of said actuators;

said resistive elements of each actuator electrically engaged along with steering diodes to said coil driving wires of each said motor and said sensing wires of each actuator; and said electrically controller circuit measures individual actuator and antenna position remotely from said actuators and antennas by applying a low voltage signal through a coil driving wire an actuator to be measured, sensing resistance of said linear resistivity element level as a result of relative position of sliding contact position through said sensing wire for said actuator to be measured, and comparing sensed resistance with predetermined values to determine individual actuator and antenna position.

19. The system of actuators of claim 18, wherein:

wherein said electrical controller circuit contains a bi-polar, multi-level power converter sub-circuit;

said bi-polar multi-level power converter sub-circuit varies voltage levels to said motor coils passing a higher initial voltage and reducing said voltage following initial voltage application; and wherein said bi-polar multi-level power converter sub-circuit has a single voltage power supply.

20. A system of actuators for repositioning individual devices, comprising:

a single electrical controller circuit;

at least two actuators, each engaged to individual devices to be actuated, and each actuator comprised of:
 a motor with a drive shaft;
 a coil driving wire from said electrical controller circuit electrically engaged to each motor coil of said motor;
 a sliding element engaged to said drive shaft, said sliding element moving in a linear pattern upon said motor energizing and driving said drive shaft;
 a linear resistive element electrically engaged to said electrically controller circuit; and
 a sliding contact on said sliding element for varying electrical resistance of said resistive element as sensed in said electrical controller circuit as a function of said sliding element position;

said electrical controller having a sensing wire engaged electrically to each of said actuators;

said resistive elements of each actuator electrically engaged along with steering diodes to said coil driving wires of each said motor and said sensing wires of each actuator;

said electrical controller circuit having one bi-polar multi-level power converter sub-circuit engaged to provide driving power to each said coil driving wire;

said bi-polar, multi-level power converter comprised of:
 a controller for varying duty cycle of transistors of a transistor bridge sub-circuit;
 a first transistor of said transistors of said transistor bridge electrically engaged to a positive voltage rail to apply a portion of said positive voltage rail dependent on said varied duty cycle of said first transistor;
 a second transistor of said transistors of said transistor bridge electrically engaged to a negative voltage rail to apply a portion of said negative voltage rail dependent on said varied duty cycle of said second transistor;
 said output of said transistor bridge directed to a load through a filter;
 a charge rebalancing sub-circuit electrically engaged at an outlet of said transistor bridge, comprising:
  a transformer aligned to invert the output of the transistor bridge through one of two diodes, one engaged to said positive voltage rail and one engaged to said negative voltage rail.

21. The system of claim 20, wherein:

said electrically controller circuit measures individual actuator position remotely from said actuators by applying a low voltage signal from said bi-polar, multi-level power converter through a coil driving wire an actuator to be measured, sensing resistance of said linear resistivity element level as a result of relative position of sliding contact position through said sensing wire for said actuator to be measured, and comparing sensed resistance with predetermined values to determine actuator and device to be actuated position.

22. An actuator for linearly repositioning an antenna in combination with an antenna, comprising:

a motor with a drive shaft;

an electrical controller circuit for remotely controlling said motor, said electrical controller circuit having a bi-polar multi-level power converter sub-circuit engaged to each motor coil of said motor for providing power;

said bi-polar, multi-level power converter comprised of:
 a controller for varying duty cycle of transistors of a transistor bridge sub-circuit;
 a first transistor of said transistors of said transistor bridge electrically engaged to a positive voltage rail to apply a portion of said positive voltage rail dependent on said varied duty cycle of said first transistor;
 a second transistor of said transistors of said transistor bridge electrically engaged to a negative voltage rail to apply a portion of said negative voltage rail dependent on said varied duty cycle of said second transistor;
 said output of said transistor bridge directed to a load through a filter;
 a charge rebalancing sub-circuit electrically engaged at an outlet of said transistor bridge, comprising:
  a transformer aligned to invert the output of the transistor bridge through one of two diodes, one engaged to said positive voltage rail and one engaged to said negative voltage rail;

a sliding element engaged to said drive shaft, said sliding element moving in a linear path upon said motor energizing and driving said drive shaft;

said sliding element engaged to an antenna for repositioning said antenna;

a linear resistive element electrically engaged to said electrically controller circuit; and a sliding contact on said sliding element for varying electrical resistance of said resistive element as sensed in said remote electrical controller circuit as a function of position of said sliding element and antenna.

* * * * *